US008194651B2

(12) United States Patent
Panagopoulos et al.

(10) Patent No.: US 8,194,651 B2
(45) Date of Patent: Jun. 5, 2012

(54) METHOD AND APPARATUS FOR USER AUTHENTICATION

(75) Inventors: Dean N. Panagopoulos, Lynn, MA (US); Douglas Raum, Beverly, MA (US); Tader Chang, Hopkinton, MA (US); William Hume Vance, Somerville, MA (US)

(73) Assignee: Zoom Telephonics, Inc., Boston, MA (US)

( * ) Notice: Subject to any disclaimer, the term of this patent is extended or adjusted under 35 U.S.C. 154(b) by 1716 days.

(21) Appl. No.: 10/934,350

(22) Filed: Sep. 3, 2004

(65) Prior Publication Data
US 2006/0050688 A1    Mar. 9, 2006

(51) Int. Cl.
*H04L 12/66* (2006.01)

(52) U.S. Cl. ......... 370/356; 370/353; 370/354; 370/401

(58) Field of Classification Search ................. 370/353, 370/356, 401, 352, 351, 354
See application file for complete search history.

(56) References Cited

U.S. PATENT DOCUMENTS

| 6,185,623 | B1 * | 2/2001 | Bailey et al. .................. 709/238 |
| 6,687,245 | B2 * | 2/2004 | Fangman et al. ............. 370/356 |
| 6,847,704 | B1 * | 1/2005 | Cherchali et al. .......... 379/93.05 |
| 7,114,070 | B1 * | 9/2006 | Willming et al. ............. 713/156 |
| 7,474,665 | B2 * | 1/2009 | Cho .............................. 370/401 |
| 2002/0141352 | A1 * | 10/2002 | Fangman et al. ............. 370/254 |
| 2005/0213567 | A1 * | 9/2005 | Mullins et al. ................ 370/352 |
| 2006/0007915 | A1 * | 1/2006 | Frame ........................... 370/352 |
| 2006/0050682 | A1 * | 3/2006 | Vance ........................... 370/352 |

OTHER PUBLICATIONS

Sollins, K., The TFTP Protocol (Revision 2). Network Working Group [online], Jul. 1992 [retrieved Aug. 10, 2004]. Retrieved from the Internet <URL: http://ftp.rfc-editor.org/in-notes/rfc1350.txt.

* cited by examiner

*Primary Examiner* — Gerald Gauthier
*Assistant Examiner* — Simon King
(74) *Attorney, Agent, or Firm* — Hamilton, Brook, Smith & Reynolds, P.C.

(57) ABSTRACT

Authentication of a request for access to user specific information associated with a VoIP device is performed transparently, without any user identification or password required. A unique device identifier associated with the VoIP device is included in the request for access and used as an authentication token.

29 Claims, 7 Drawing Sheets

Voice over IP

| Item | | Status |
|---|---|---|
| Registration Status | 502 | 0 |
| User ID | 504 | |
| Auto-Configuration Status | 506 | AutoConfiginactive |
| World Wide Number | 508 | 0 |

Basic Setup

510 — Auto Account Configuration
Server: [0.0.0.0]
512 — Filename: [00_40_36_18_90_6A.ini]
514 — Encryption ☐
516
522 — [Download Configuration Now]

Select Ring & Tone by Country Region
[US/Canada - V0IP ▼] 520
Display Name — 518
[ ]
524 — VoIP only Mode: ☐

[Save Changes]

After you have saved your changes, you must write the new settings to flash and reboot. Click the button below to do this.

[Write Settings to Flash and Reboot]

Advanced Options

[Supplementary Services] [Advanced VoIP Setup] [GlobalVillage Features]
526

GLOBAL VILLAGE

Activate Account

Welcome to GlobalVillage!
This appears to be your first time logging in. Before you can start making phone calls, we just need to get a few bits of information and have you set a password to access this website in the future.
After you have entered your information, you will be granted 10 free minutes of phone calls.
New Account Information (Items in red are required.)

First Name ⎯652
Last Name ⎯654
E-mail
Country ▽⎯651 ⎯656

Enter New Password
Confirm Password

☐ By checking here, you acknowledge that you have read and accept the GlobalVillage Terms of Service. Click here to review the Terms of Service now.

Update Information ⎯660 my account
account/summary
personal profile
payment information
billing statement
my calls
missed calls
outgoing calls
incoming calls
my services
add /modify services
call controls
conferencing
call forwarding
voicemail
how to dial directory
⊗
log out

FIG. 6

METHOD AND APPARATUS FOR USER AUTHENTICATION

BACKGROUND OF THE INVENTION

Real-time audio, such as a telephone conversation between two people using telephones, may be transmitted over a packet network such as the Internet using Voice over Internet Protocol ("VoIP"). VoIP may be used instead of transmitting the telephone conversation over a Public Switched Telephone Network (PSTN) switched connection in order to take advantage of expanded service offerings and/or eliminate or reduce charges for a long distance telephone call.

To transmit voice data over the packet network, a packet transmitter in a source Internet node encodes the analog voice signal, stores the encoded data in the payload of one or more data packets, and transmits the data packets over the packet network.

A subscriber with Internet service subscribes to a VoIP Service that sets up sessions for transferring real-time audio over the Internet. A subscriber may monitor and control his or her service via a browser over the Internet. The subscriber may monitor and control settings related to call forwarding, conferencing, voice messaging and the like, and may access information like call logs and billing status. To protect unauthorized access to the subscriber's user-specific information, the VoIP Service typically assigns a user identifier and a password to each subscriber. The user identifier and password identify the subscriber to the VoIP Service.

SUMMARY OF THE INVENTION

Prior to accessing the user-specific information, the subscriber must log on to the VoIP service, typically by providing a user identifier and password in order to identify the subscriber to the VoIP Service. For example, the subscriber may log on to disable caller-ID for all outgoing calls or for a particular call or to view call logs and billing status. The logon procedure ensures that access to a subscriber's user-specific information is secure. However, the subscriber must provide this information each time the subscriber wishes to access the user-specific information.

According to the present invention, subscribers to an online service can more easily access their user-specific information because authentication and binding of a remote device to user-specific information is performed transparently, without any user identifier or password required from the subscriber. The subscriber transparently accesses all of the user-specific information stored by the VoIP service such as call logs and billing status. The access to the user-specific information is typically provided in response to selecting a button on a web page.

A method authenticates an IP request for access to user-specific information associated with a user's IP-capable VoIP device. An IP request is received from the VoIP device over an IP network. Access to the user-specific information is provided in response to the IP request.

According to certain embodiments, the device identifier is a Media Access Control Address and part or all of the IP network is the Internet. The IP request may include a second identifier derived from information provided by an on-line service. The device identifier may be received in a Trivial File Transfer Protocol Read Request packet from the device. The assigned user identifier may be forwarded in a payload of a Trivial File Transfer Protocol data packet. The request may be in the form of a URL. A HTTP server in the device may receive a command to access the user-specific information, and the device may then generate a URL to access that information.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a page displayed on the monitor of the computer for configuring VoIP in the adapter 100 shown in FIG. 1;

FIG. 6 is a page displayed by the browser in the computer shown in FIG. 1 after the first request to access the VoIP Service is received from the adapter.

DETAILED DESCRIPTION OF THE INVENTION

A description of preferred embodiments of the invention follows.

Figure 1:
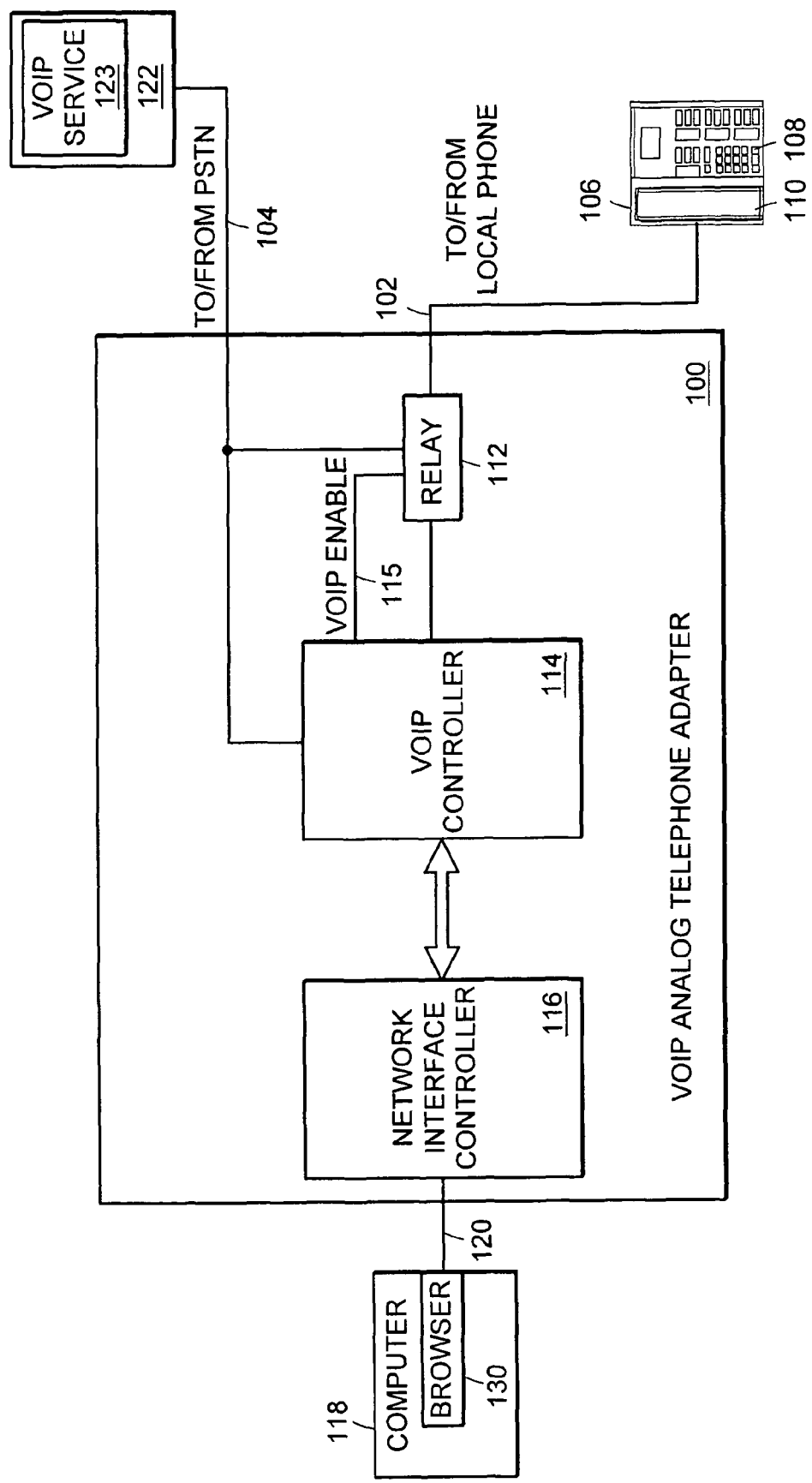
FIG. 1 is a block diagram of the VoIP analog telephone adapter with a computer connected to the adapter for configuring the adapter according to the principles of the present invention.

FIG. 1 is a block diagram of a Voice over Internet Protocol (VoIP) analog telephone adapter (VoIP device) 100 with a computer 118 coupled to the adapter 100 for configuring the adapter according to the principles of the present invention. VoIP, also referred to as Internet Telephony delivers digitized audio in packet form over a packet network using the Internet Protocol (IP).

In the embodiment shown in FIG. 1, the adapter 100 communicates with a VoIP Service 123 stored in a server 123 over a telephone line 104. The VoIP Service allows real-time audio from the telephone 106 to be transmitted over the Internet. The VoIP service also stores user-specific information for the adapter and provides access to the user-specific information. The user-specific information can include call logs and billing information for VoIP calls.

The VoIP analog telephone adapter 100 includes a phone port 102 for connecting to a conventional telephone 106 and a port 104 that is connected to a DSL-enabled telephone line. Port 104 may be an Asymmetric Digital Subscriber Line (ADSL) enabled telephone line.

A network device that communicates over a packet network is typically assigned a unique MAC (Media Access Control) address by the manufacturer of the device. The MAC address is used to identify the device when communicating over the packet network. The MAC address assigned to the adapter 100 is a unique 48-bit number, with a portion of the bits assigned to the manufacturer of the adapter 100 and the remaining bits assigned to each adapter by the manufacturer. The MAC address is stored in non-volatile memory in the network interface controller 116 in the adapter and transmitted in the header of packets transmitted over a packet network. The MAC address is used as a device identifier to access user-specific information stored by the VoIP service.

The MAC address is a unique identifier built into the adapter, typically assigned by the manufacturer and stored in non-volatile memory prior to shipping the adapter to the subscriber. A device identifier is used to ensure that the VoIP service is only provided to adapters provided by a particular manufacturer. In one embodiment, the MAC address is used as the device identifier to access the user-specific information. However, in alternate embodiments, the device identifier can be any unique identifier assigned by a manufacturer and stored in the adapter by the manufacturer of the adapter.

In order to send real-time audio over the Internet using VoIP, the adapter 100 must first register with the VoIP Service 123. In one embodiment, during the first communication between the adapter 100 and the VoIP Service 123, the adapter transmits its unique MAC address to the VoIP Service. The VoIP Service saves this MAC address and associates the MAC address with a User Identifier (UI), Authorization Identifier (AI) and a SIP password (SIP PW) that are assigned to the adapter 100. The adapter may then register with the VoIP service using the assigned UI, AI, and SIP PW, to allow the adapter to originate and receive VoIP calls. The SIP password is used to make and receive calls and is not related to the website password described later that can be used for accessing user-specific information stored by the VoIP service. The MAC address is associated with user-specific information set up for the subscriber and is used to authenticate requests for access to the subscriber's user-specific information. The method for configuring the adapter to make and receive VoIP calls using the VoIP Service will be described later in conjunction with FIG. 3.

When the adapter is configured in VoIP mode and VoIP service is available, real-time audio from the telephone 106 is transmitted over the PSTN to/from the VoIP Service 123. A caller can make a VoIP call to a subscriber of a VoIP service by using the other subscriber's VoIP number. For example, the VoIP service may be the Global Village VoIP service provided by Zoom Telephonics, Inc. Subscribers to this VoIP service are assigned unique VoIP numbers, currently 7 digits. VoIP calls can also be made from the adapter using other VoIP Services, by dialing the callee's assigned VoIP number.

In the embodiment shown, the adapter 100 is coupled to a computer 118 on which an Internet browser 130 is installed. The computer 118 can be any computer well-known to those skilled in the art and includes a CPU, memory, keyboard, monitor and a network interface controller for interfacing to the adapter 100. In one embodiment the computer 118 communicates with the adapter over a data link 120 using the Ethernet protocol. In an alternative embodiment, the computer communicates with the adapter over a data link 120 using the Universal Serial Bus protocol. For example, in an embodiment in which the digitized audio stream is transmitted over a DSL-enabled telephone connection 104, the computer 118 is used to configure the VPI/VCI numbers assigned by the VoIP Service 123 to the adapter 100. However, in an alternate embodiment, configuration may be performed using other means, such as the telephone keypad 108.

The configuration information is entered through a user interface provided by the browser 130 that is displayed on the computer's monitor. After the configuration information has been entered it is saved in non-volatile memory, such as flash memory, in the VoIP controller 114 in the adapter 100.

The VoIP analog telephone adapter 100 includes a relay 112 that allows the telephone 106 to be connected to the PSTN or to be connected to the VoIP controller 114. VoIP, also referred to as Internet Telephony, delivers digitized audio in packet form over a packet network using the Internet Protocol (IP).

The VoIP controller 114 converts the analog signal received from the telephone into digital data, packetizes the digital data and sends the packetized digital data over a broadband connection to an Internet Service 123 which then forwards the packet over the Internet. The packets are passed along through the Internet, finally reaching the intended party where they are converted back to an analog signal.

Figure 2:
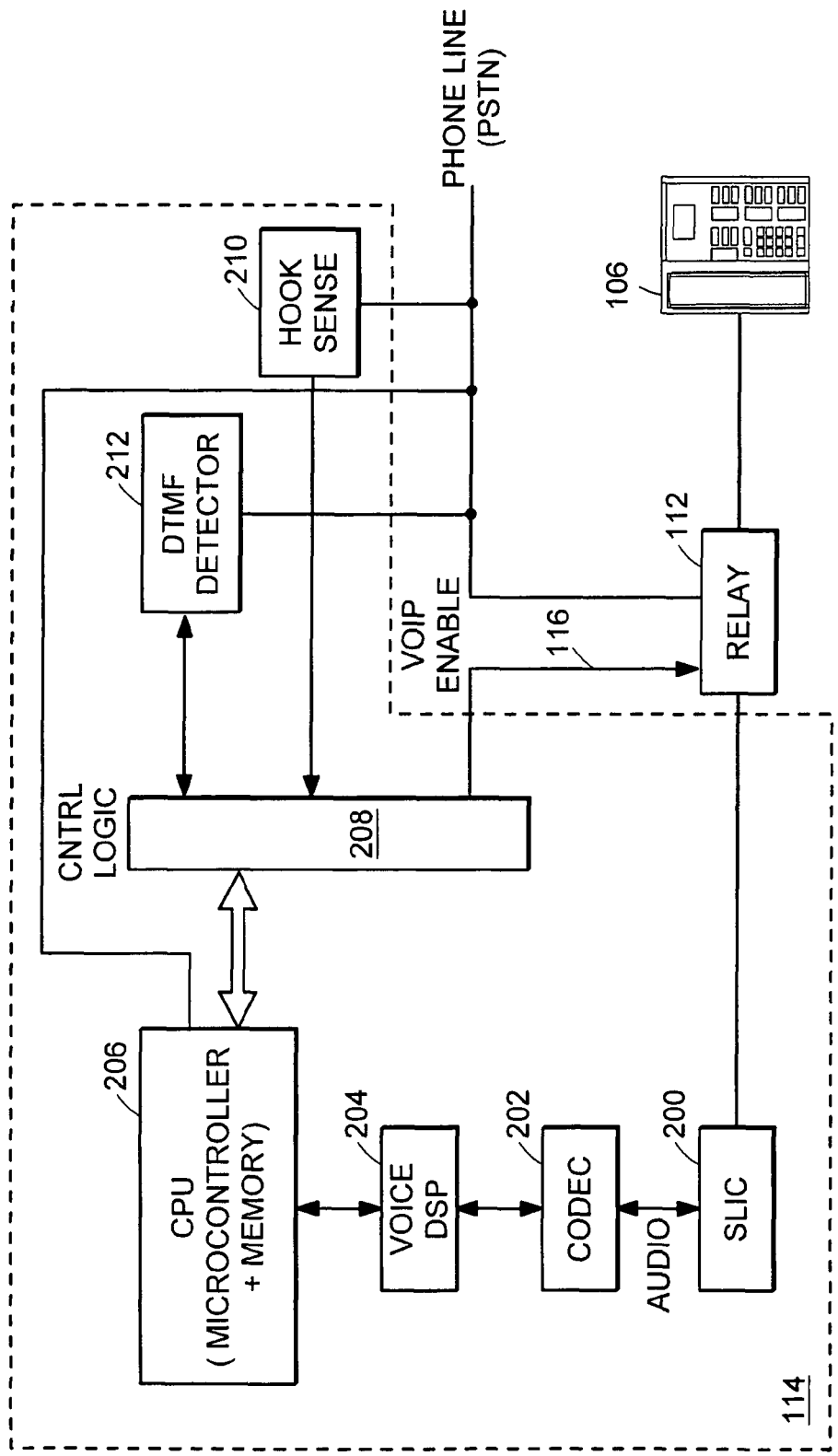
FIG. 2 is a block diagram of the VoIP controller in the VoIP analog telephone adapter shown in FIG. 1.

FIG. 2 is a block diagram of the VoIP controller 114 shown in FIG. 1. The VoIP controller 114 includes a Subscriber Line Interface Circuit (SLIC) 200. The SLIC 200 provides telephone interface functionality like a Central Telephone Office to the local telephone 106. A Voice Digital Signal Processor (which can operate as a tone generator) 204 coupled through a CODEC 202 to the SLIC includes voice encoding logic for encoding the audio prior to transmitting it as data packets.

Control logic 208 includes circuitry for controlling a DTMF detector 210, a hook-sense detector 212 and the state of the PSTN relay 112. The control logic 208 is typically coupled to a CPU module 206 that includes a micro-controller and memory (volatile and non-volatile). The non-volatile memory is Flash memory that stores an image of the instruction code for the microcontroller, as well as configuration data for the adapter. The adapter refers to the configuration data when it makes certain decisions. One such decision is whether to direct a request to establish a telephone connection over a telephone network or over a packet network. The volatile memory may be, for example Synchronous Dynamic Random Access Memory that at run-time contains instruction code for execution by the microcontroller together with data and data buffers that are required for operation of the controller.

The configuration data may be modified by a configuration manager in the adapter. The instruction code can include the configuration manager that determines whether the circuitry directs a request for establishing a connection to the telephone network or the packet network. The configuration manager can be implemented as a web-server, an Interactive Voice Response (IVR) or some other mechanism in the adapter. The IVR is an automated system that prompts a caller to select a touch tone key in order to request a particular function. An IVR can also interpret voice.

The user can access the configuration manager through a web-browser, in the case of a HTTP server, through an attached telephone, in the case of the IVR, or through some other means. By means of the configuration manager, the user can set the adapter to one of the following modes: (1) always direct calls to the packet network; (2) direct calls to the packet network only if the first digit dialed is a '#' or (3) direct calls to the telephone network only if the first digit dialed is a '#'.

Figure 3:
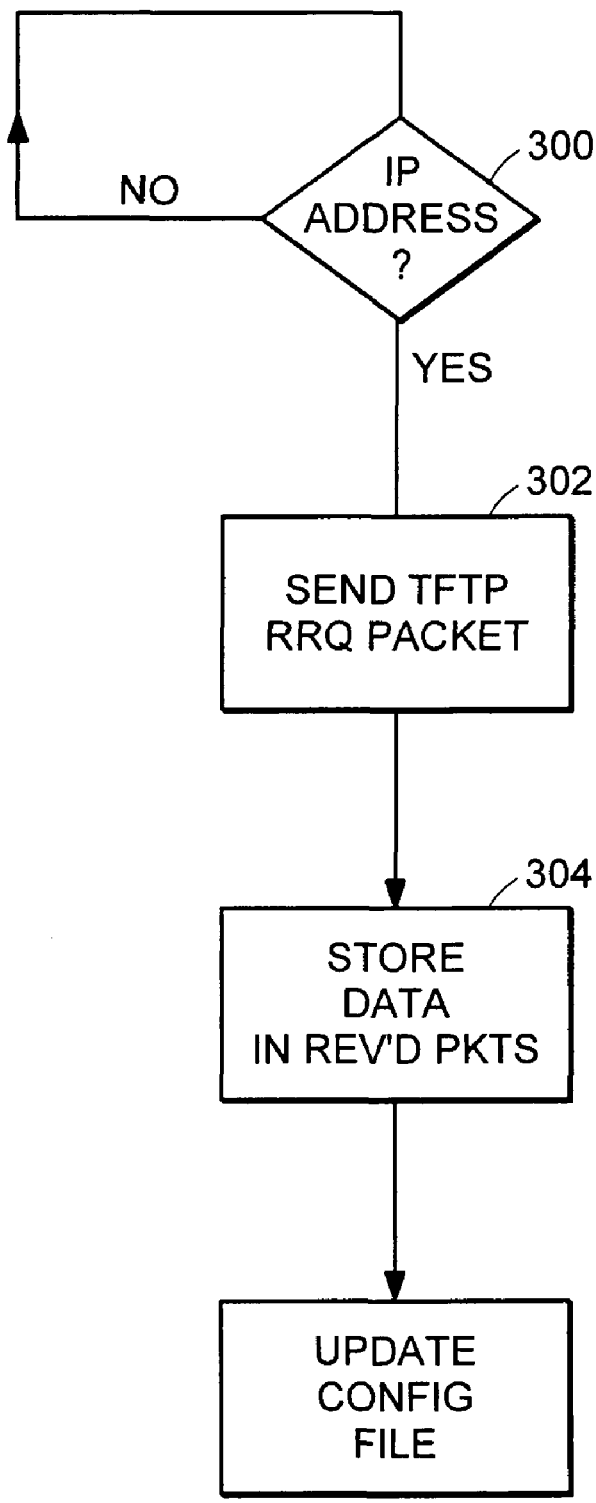
FIG. 3 is a flow chart illustrating a method for configuring the adapter to make and receive calls through a VoIP Service.

FIG. 3 is a flow chart illustrating a method for configuring the adapter 100 shown in FIG. 1 to make and receive calls through a VoIP Service. In one embodiment the VoIP Service is Global Village provided by Zoom Telephonics, Inc. The Uniform Resource Locator (URL) or IP Address for Global Village is pre-configured at manufacturing time and stored in non-volatile memory in the adapter 100. The URL is an address for the VoIP Service used by a browser 130 (FIG. 1) to locate the VoIP Service. A URL specifies the protocol to be used to access the VoIP Service, the name of the server 122 (FIG. 1) on which the VoIP Service resides, and optionally the path to the VoIP Service on the server.

At step 300, when the adapter 100 is first connected to the Internet 123, it automatically receives an IP address through the Dynamic Host Configuration Protocol (DHCP). DHCP is a TCP/IP protocol that automatically assigns a temporary IP address to a network device when the network device connects to the network. Alternatively, the device may have been assigned a static IP address.

At step 302, after the adapter has received the assigned IP address, an automatic download of configuration data from the VoIP Service 123 is instigated by the adapter without any user input. The adapter 100 communicates with the VoIP Service 123 using the standard Trivial File Transport Protocol described in Internet Engineering Task Force (IETF) Request for Comments ("RFC") 1350. The Trivial file transfer protocol is a subset of the File Transfer Protocol (FTP) that is used to read and write files to/from a remote server. It is implemented on top of the Internet User Datagram Protocol (UDP). A transfer begins with a request to read or write a file. If the request is granted, a connection is opened and the file is sent in fixed length blocks of 512 bytes. Each data packet is acknowledged by the receiver. To establish a connection to read a file, the adapter sends a read request to a TFTP server associated with the VoIP Service with the VoIP Service's Transfer Identifier (TID).

Continuing with step 302, in one embodiment, after the adapter has received the IP address, the device sends a TFTP Read Request (RRQ) packet (as defined in RFC 1350) to the VoIP Service. The file name stored in the filename field of the Read Request (RRQ) packet identifies the MAC address of the adapter, which as discussed previously is a unique identifier for the adapter 100 and stored in the device by the manufacturer. Upon receiving the RRQ, the VoIP Service validates the MAC_Addr, and generates a file named <Device_MAC_Addr>.ini, with user-specific information for the requesting device. The .ini file is in text format. The manufacturer portion of the MAC address ensures that only requests from adapters having particular manufacturer identifiers are processed by the VoIP service. For example, only adapters having a manufacturer identifier identifying the adapter as sourced by Zoom Telephonics, Inc may be allowed access to the VoIP service.

At step 304, TFTP transfer occurs between the device and the VoIP Service in the first exchange with the device and the VoIP Service and received in the <Device_MAC_Addr>.ini file. The server sends the <Device_MAC_Addr>.ini file to the adapter, in the payload of a series of data packets, as specified by TFTP. The adapter receives the <Device_MAC_Addr>.ini file, and stores it in non-volatile memory. The stored file is named update.reg.

At step 306, the adapter reboots. As part of reboot procedure, the adapter updates sections of a configuration file (config.reg) stored in the adapter with the specific VoIP Service user-specific information User ID, Authorization ID, and Session Initiation Protocol (SIP) Password assigned by the VoIP Service. The adapter is now ready to make and receive SIP-only phone calls using the Session Initiation Protocol (SIP) standard described in IETF RFC 3261. Alternative implementations may use other VoIP protocols.

Figure 4:
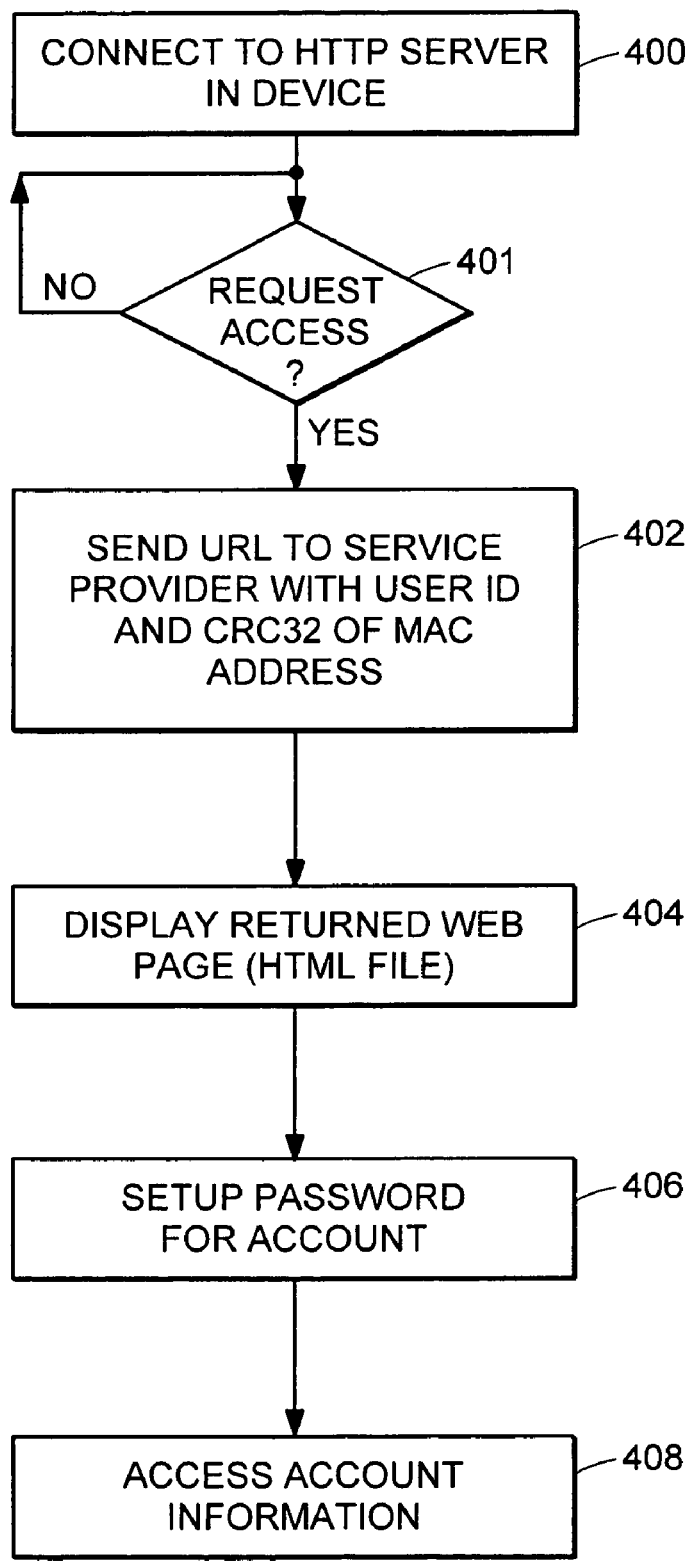
FIG. 4 is a flow chart illustrating a method for accessing user specific information located at the VoIP service.

FIG. 4 is a flow chart illustrating a method for accessing user-specific information located at the VoIP Service. Access to user-specific information stored on the VoIP Service is performed using the Hypertext Transfer Protocol (HTTP) or the Hypertext Transfer Protocol Secure (HTTPS). HTTP is a protocol used to send requests from a browser to a web server and to send pages from web servers back to the requesting browser. HTTPS is a variation of HTTP that provides for encryption and transmission through a secure port allowing HTTP to run over a security mechanism known as Secure Sockets Layer (SSL). At step 400, the VoIP service provider connects to the HTTP Server in the VoIP device. The HTTP server is a software application stored in memory in the VoIP device that handles the processing of HTTP packets. At step 401, the browser displays a button on a web page that is mapped to a function to connect to the VoIP Service.

FIG. 5 is a page displayed on the monitor of the computer for configuring VoIP in the adapter 100 shown in FIG. 1. The registration status 502 indicates whether the adapter is registered with a VoIP service, and if not, the last registration step that was provided. The User ID 504 is the number assigned by a VoIP service. This number is typically the same as the VoIP number assigned to the adapter. The Auto-configuration status 506 indicates whether the adapter has received automatic user-specific information configuration information from the VoIP service. The World Wide Number 508 is a Direct Inward Dialing (DID) number that can be used to call the telephone connected to the adapter on the VoIP connection from any telephone connected to the PSTN. Server 510 is the IP address or Uniform Resource Locator (URL) of the VoIP service's Trivial File Transfer Protocol (TFTP) server. The Filename 512 is the name of the configuration file for the adapter that is saved on the TFTP server. The encryption selection box 516 is checked if the service provider supports encryption of the downloaded configuration file. The display name 518 is the text to be displayed at the callee as the caller identifier when a VoIP call is placed. The Select Tone & Ring by Country/Region 520 allows the adapter to be customized for ring and dial tone based on country and region. Download Configuration Now 522 is selected to initiate a download of updated user-specific information from the service provider. VoIP only mode 524 allows the adapter to be configured so that all calls originating from the local phone connected to the adapter are directed through the VoIP controller. While the adapter is configured for VoIP only, all calls made from the local phone are automatically directed through the VoIP controller without the need for the caller to hit the '#' key prior to making the call.

Returning to FIG. 4, at step 402, in one embodiment, after the user presses the button labeled "Global Village Features" 526 using an input device such as a mouse, the device generates a Uniform Resource Locator (URL). The URL includes the User ID provided by the VoIP Service and stored in the update.reg file in the adapter, and a 32 bit Cyclic Redundancy Check (CRC32) of the device's MAC address. For example, to access user-specific information stored at the VoIP Service, the URL can be: https://secure.globalvillage.com/dlogin.php?Id=$username$crc32

A 32-bit Cyclic Redundancy Code ("CRC") computed on the MAC address is sent instead of sending the MAC address. The MAC address is converted to a numeric value (32-bit CRC) for inclusion in the URL. A numeric value reduces the likelihood of URL encoding errors. The details of computing a CRC are conventional and beyond the scope of this invention.

Although the request is to a secure site (as indicated by the HTTPS protocol in the URL), the URL itself is sent in plaintext. The VoIP service extracts the username from the URL, retrieves the MAC address associated with the username that is stored by the VoIP service and computes a 32-bit CRC on the MAC address. The computed CRC is compared with the CRC received in the URL to ensure that the request is received from a registered user. Once connected to the VoIP Service, all transactions between the browser and the VoIP service 123 are secured by 128-bit encryption, utilizing the encryption capabilities of the browser 130. In an alternative embodiment, only the MAC Address may be included in the URL. In yet another embodiment, a digest of the user ID and MAC Address may be included in the URL.

In one embodiment, at step 404, the VoIP Service sends a HTTP page to the browser so that the user can set a password for access to the user-specific information on the website.

FIG. 6 illustrates the HTTP page 650 displayed by the browser 130 in the computer 118 shown in FIG. 1, after the first request to access the VoIP Service is received from the adapter 100. The page includes fields for entering information regarding the subscriber. The information requested includes first name 652, last name 654, e-mail address 656 and country 658. In the embodiment shown, the user is also requested to enter a website password and to confirm the password by retyping the password in the confirm password entry. However, in alternate embodiments the additional website is not used because the device identifier and user identifier provide sufficient authentication for the adapter. Returning to FIG. 4, at step 406, after all the requested information has been entered on the page, the user selects the button labeled "update information" 660 to send the information and the selected password to the VoIP Service.

At step 408, the user may now access through the browser user-specific information stored by the VoIP Service, and configure desired services (such as call forwarding, for example). User-specific information is also used by the VoIP Service (an online service) to maintain a record of customer usage for billing purposes.

Figure 7:
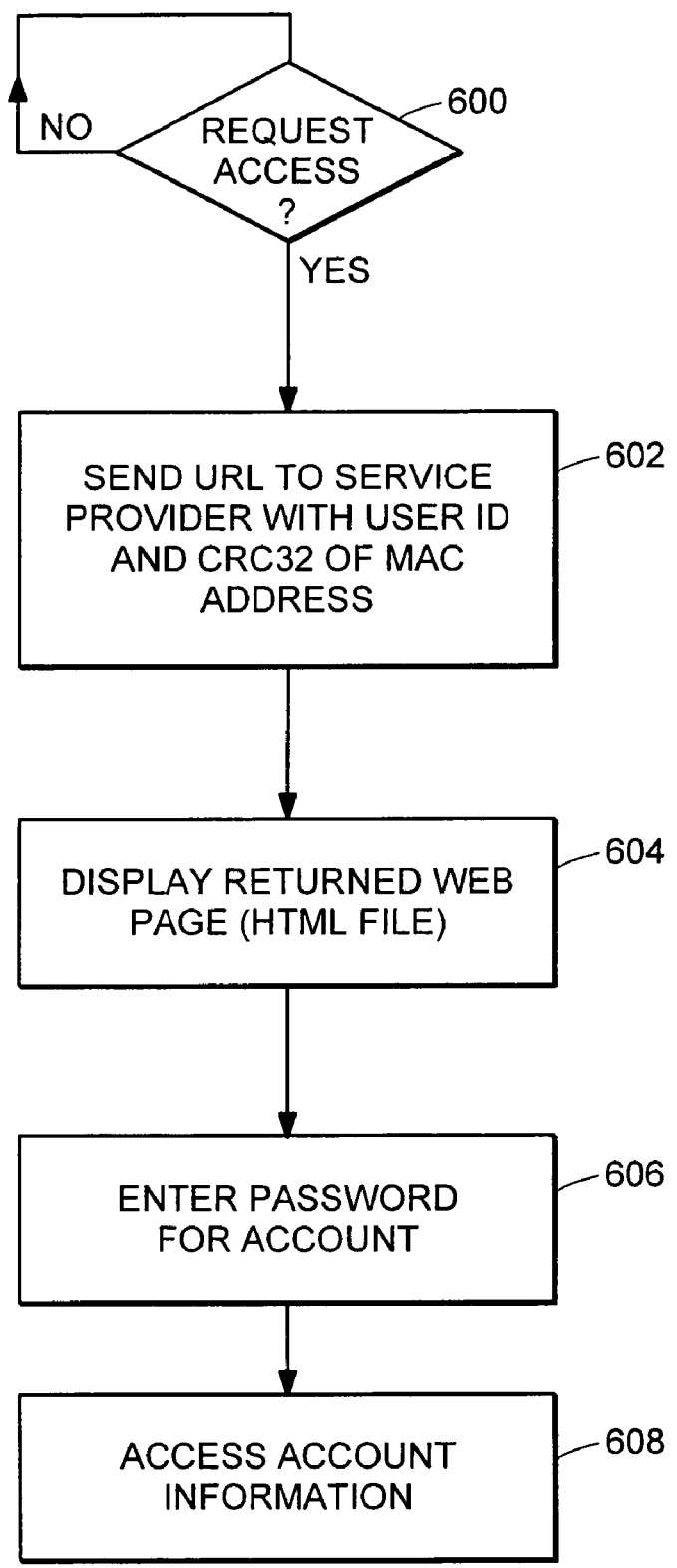
FIG. 7 is a flow chart of a method implemented in the adapter for subsequent accesses to the VoIP Service.

FIG. 7 is a flow chart of a method for subsequent accesses to the subscriber's user-specific information. At step 600, the browser 130 executing on the computer displays a web page that includes a button selectable by a user to request access to VoIP Service similar to the button displayed on the web page shown in FIG. 5.

At step 602, after the browser detects that the button has been selected, a Universal Resource Locator (URL) is generated that includes the web address of the VoIP Service, for example, "globalvillage.com", the login page "dlogin.php", the User Identifier provided during configuration of the adapter "$username" and stored in the adapter and the CRC32 of the MAC address stored in the adapter "crc32". The URL is sent in plain text to the VoIP Service web site. In alternative embodiments, the URL may contain only the MAC Address or a digest of the MAC Address and user ID, or the password, or some combination thereof.

At step 604, after verifying that the request is received from an adapter having a registered MAC address, a HTML file for the login page is returned from VoIP Service and displayed by the browser in the computer. In one embodiment, the user is prompted to enter the VoIP Service website password assigned to the user identifier and associated device's MAC address. In an alternate embodiment, instead of prompting the user for a website password, the website password is sent in encrypted form in the URL to the VoIP Service website, so that the user doesn't have to enter the password to access the user-specific information. In yet another embodiment, the account information is provided to the user without any password. The encrypted password can be sent in "hash" format, such as MD5 in the URL so that the password is not included as plaintext in the URL. The MD5 algorithm calculates a 128-bit checksum for a string such as "password". The 128-bit checksum can be represented as a string of 32 hex characters. For example, the encrypted password (represented as a string of 32 hex characters) is included in the URL as follows:

"dlogin.php?Id=bb637f15b15fbc448c528c4ecb9210ad"

At step 606, the user enters the password assigned to the user-specific information, if a password is required.

At step 608, after the entered password has been verified by the VoIP Service, the user has complete access to the user-specific information on the website. The user can manage many features such as caller-id, call forwarding, call blocking, and voicemail through the subscriber user-specific information. For example, in one embodiment, the user-specific information can be used to disable caller-ID for all outgoing calls or for a particular call and calls can be redirected to another destination when the phone is busy. The user can also monitor information such as call logs and billing status.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing access to Voice over Internet Protocol (VoIP) service user-specific user account information stored in a VoIP service, the method comprising:
   receiving, at the VoIP service from a VoIP device over an Internet Protocol (IP) network, an IP request for access to VoIP service user-specific user account information stored in the VoIP service and associated with the VoIP device, the IP request including a device identifier built into the VoIP device and uniquely identifying the VoIP device;
   authenticating the received IP request by comparing the received device identifier with device identifiers, associated with VoIP service user-specific user account information for VoIP devices of respective users of the VoIP service, stored in the VoIP service; and
   providing access to VoIP service user-specific user account information associated with the VoIP device in response to the received IP request if the received device identifier is stored in the VoIP service, the access to the user-specific user account information being provided to a user of the VoIP device.

2. The method of claim 1, wherein part or all of the IP network is the internet.

3. The method of claim 1, wherein the IP request includes a second identifier derived from information provided by an on-line service.

4. The method of claim 1, wherein the device identifier is a Media Access Control (MAC) address.

5. The method of claim 3, wherein the device identifier is sent by the device in a Trivial File Transfer Protocol Read Request packet.

6. The method of claim 5, wherein the Trivial File Transfer Protocol Read Request packet is sent promptly after the VoIP device powers up and achieves on-line connectivity.

7. The method of claim 3, wherein the VoIP device receives the second identifier as part of a Trivial File Transfer Protocol file transfer.

8. The method of claim 1, wherein the IP request to access the VoIP service user-specific user account information is in the form of a Uniform Resource Locator (URL).

9. The method of claim 8, wherein a Hypertext Transfer Protocol (HTTP) server in the device receives a command to access VoIP service user-specific user account information, and the device then generates a URL for that information.

10. A Voice over Internet Protocol (VoIP) service comprising:
    VoIP service user-specific user account information, stored in the VoIP service, for VoIP devices of respective users of the VoIP service, associated with device identifiers built into the VoIP devices and uniquely identifying the VoIP devices; and an authentication routine that, in response to receiving, from a VoIP device over an Internet Protocol (IP) network, an IP request for access to VoIP service user-specific user account information associated with the VoIP device, the IP request including the device identifier of the VoIP device, authenticates the received IP request by comparing the received device identifier with device identifiers stored in the VoIP service, and provides access to VoIP service user-specific user account information associated with the VoIP device if the received device identifier is stored in the VoIP service, the access being provided to a user of the VoIP device.

11. The VoIP on-line service of claim 10, wherein part or all of the IP network is the Internet.

12. The VoIP on-line service of claim 10, further comprising:
a configuration file associated with each VoIP device, the configuration file providing a second identifier in response to receipt of the device identifier, the IP request to access VoIP service user-specific user account information includes the second identifier in addition to the device identifier.

13. The VoIP on-line service of claim 10, wherein the device identifier is a Media Access Control (MAC) address.

14. The VoIP on-line service of claim 10, wherein the device identifier is received in a Trivial File Transfer Protocol Read Request packet from the device.

15. The VoIP on-line service of claim 14, wherein the Trivial File Transfer Protocol Read Request packet is sent promptly after the VoIP device powers up and achieves on-line connectivity.

16. The VoIP on-line service of claim 12, wherein the second identifier is forwarded as part of a Trivial File Transfer Protocol file transfer.

17. The VoIP on-line service of claim 10, wherein the request to access VoIP service user-specific user account information is in the form of a Uniform Resource Locator (URL).

18. The VoIP on line service of claim 17, wherein a Hypertext Transfer Protocol (HTTP) server in the device receives a command to access VoIP service user-specific user account information, and the device then generates a URL for that information.

19. A Voice over Internet Protocol (VoIP) service for providing access to VoIP service user-specific user account information, the service comprising:
means for receiving, at the VoIP service from a VoIP device over an Internet protocol (IP) network, an IP request for access to VoIP service user-specific user account information stored in the VoIP service and associated with the VoIP device, the IP request including a device identifier built into the VoIP device and uniquely identifying the VoIP device;
means for authenticating the received IP request by comparing the received device identifier with device identifiers, associated with VoIP service user-specific user account information for VoIP devices of respective users of the VoIP service, stored in the VoIP service; and
means for providing access to VoIP service user-specific user account information associated with the VoIP device in response to the received IP request if the received device identifier is stored in the VoIP service, the access to the user-specific user account information being provided to a user of the VoIP device.

20. A Voice over Internet Protocol (VoIP) device comprising:
circuitry that encodes an analog voice signal into a data packet for transmission over an Internet Protocol (IP) network;
memory configured to store a device identifier built into the VoIP device and uniquely identifying the VoIP device; and
a processor configured to, in response to receiving a command from a user of the VoIP device to access VoIP service user-specific user account information stored in a VoIP service and associated with the VoIP device, generate an IP request for access to VoIP service user-specific user account information for transmission over the IP network to the VoIP service, the IP request including the device identifier.

21. A method for activating a Voice over Internet Protocol (VoIP) device, the method comprising:
upon initial connection of the VoIP device to a network, the VoIP device being one in which no user-specific account information is loaded initially, automatically receiving, at a VoIP service from the VoIP device over the network, a request to receive initial configuration data for the VoIP device from the VoIP service, the request including a device identifier built into the VoIP device and uniquely identifying the VoIP device;
at the VoIP service, automatically validating the device identifier as corresponding to a VoIP device to which the VoIP service will provide service; and
upon validation, automatically transferring the initial configuration data over the network to the VoIP device, the initial configuration data comprising user-specific account information that enables the VoIP device to become operational for VoIP operation.

22. The method of claim 21, wherein the network is an IP network and part or all of the IP network is the internet.

23. The method of claim 21, wherein the request includes a second identifier derived from information provided by an on-line service.

24. The method of claim 21, wherein the device identifier is a Media Access Control (MAC) address.

25. The method of claim 23, wherein the device identifier is sent by the device in a Trivial File Transfer Protocol Read Request packet.

26. The method of claim 25, wherein the Trivial File Transfer Protocol Read Request packet is sent promptly after the VoIP device powers up and achieves on-line connectivity.

27. The method of claim 23, wherein the VoIP device receives the second identifier as part of a Trivial File Transfer Protocol file transfer.

28. The method of claim 21, wherein the request is in the form of a Uniform Resource Locator (URL).

29. The method of claim 28, wherein a Hypertext Transfer Protocol (HTTP) server in the device receives a command to access the initial configuration data, and the device then generates a URL for the request.

* * * * *